(No Model.)
A. FREDERICKS.
Water Tanks for Locomotive Tenders.
No. 232,020. Patented Sept. 7, 1880.
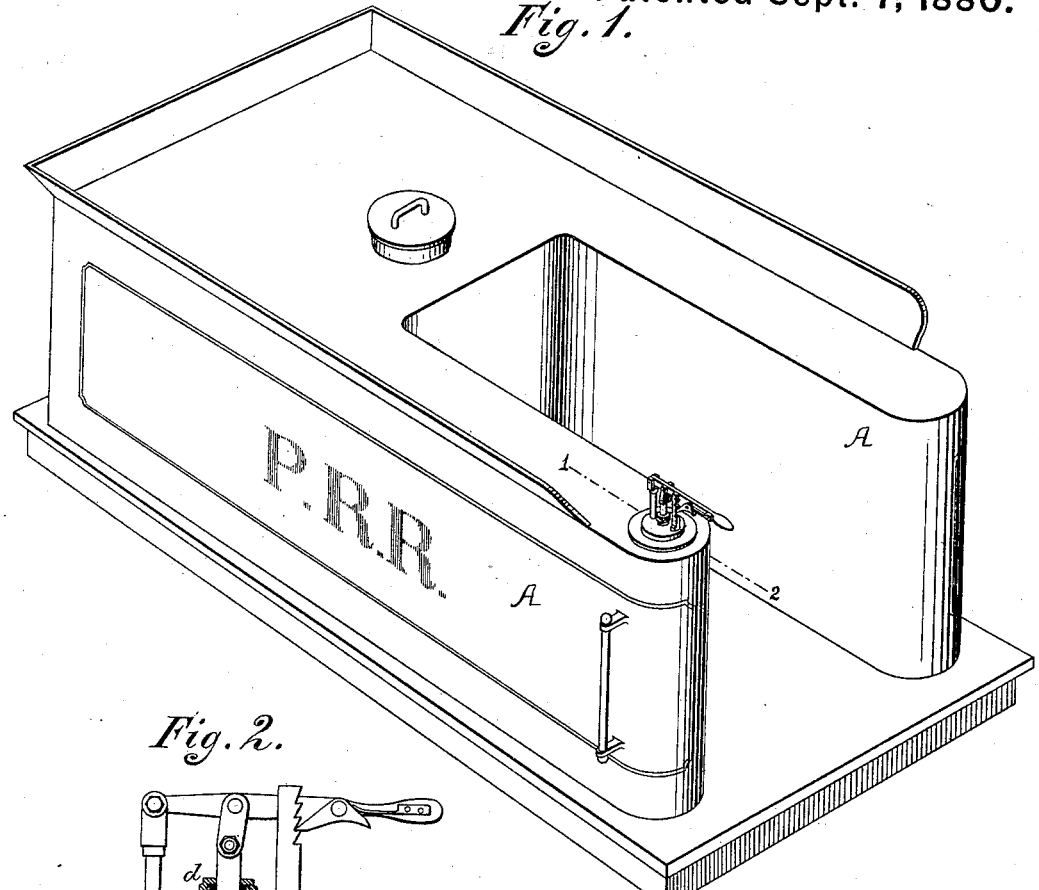
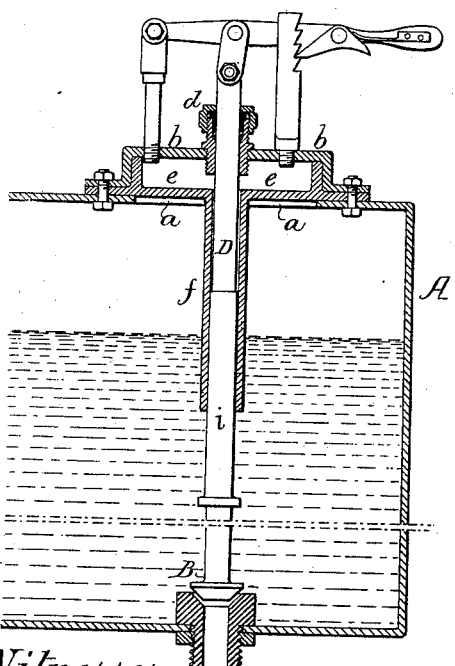
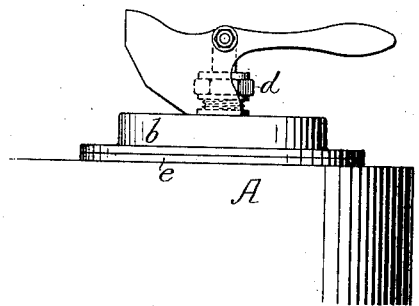
Witnesses:
Henry Fulenwider
Henry Howson Jr.
Inventor:
Andrew Fredericks
by his Attorneys
Howson and Son

UNITED STATES PATENT OFFICE.

ANDREW FREDERICKS, OF PHILADELPHIA, PENNSYLVANIA.

WATER-TANK FOR LOCOMOTIVE-TENDERS.

SPECIFICATION forming part of Letters Patent No. 232,020, dated September 7, 1880.

Application filed June 24, 1880. (No model.)

*To all whom it may concern:*

Be it known that I, ANDREW FREDERICKS, a citizen of the United States, residing in Philadelphia, Pennsylvania, have invented an Improvement in Water-Tanks of Locomotive-Tenders, of which the following is a specification.

The object of my invention is to prevent the escape of water around the valve-rod of the water-tank of a locomotive-tender—an object which I attain in the manner hereinafter set forth, reference being had to the accompanying drawings, in which—

Figure 1 is a perspective view of the tender of a locomotive with my improvement; Fig. 2, a vertical section on the line 1 2, Fig. 1, drawn to a larger scale; and Fig. 3, a side view of part of the tank, showing a modified form of device for operating the valve-rod.

A represents the casing of a water-tank of a locomotive-tender, B the discharge-valve, and D the valve-rod, the latter extending up through an opening, $a$, in the top of the tank, and being provided with means whereby i tcan be raised or lowered to open or close the valve. Usually these means comprise a transverse bar on the valve-rod and an annular cam-block surrounding the opening $a$, the latter being necessarily much larger in diameter than the valve-rod D, in order to permit the removal of the valve, so that when the tank is full, or almost full, there is a constant splashing of water through the opening, owing to the movement of the tender. In order to overcome this objection I close the opening $a$ by means of a pair of detachable plates, $b$ and $e$, each having a stuffing-box, through which the valve-rod D passes, said plates and their stuffing-boxes effectually preventing the splashing of water around the valve-rod, but being readily detachable when it is desired to remove the valve-rod and gain access to the valve.

The stuffing-box $d$ of the plate $b$ is of the usual character, having a screw-cap for actuating a follower which compresses packing to the rod; but the stuffing-box of the plate $e$ consists simply of a tubular extension, $f$, of said plate, the extension fitting snugly to a sleeve, $i$, on the valve-rod, but not so tightly as to prevent the free vertical movement of said rod.

The plate $b$ or the plate $e$ might be used separately, if desired, although it is preferable, for additional security, to use both.

Various devices for effecting the vertical adjustment of the valve-rod may be employed. Thus in Fig. 2 I have shown a lever connected to the rod by links, and having a spring-catch combined with a notched post, whereby the valve-rod is retained in the different positions to which it is adjusted, while in Fig. 3 I have shown a cam-lever hung directly to the upper end of the valve-rod, and bearing on the plate $b$ for effecting the same result.

I claim as my invention—

1. The combination of the water-tank of a locomotive-tender, having an opening, $a$, the valve-rod D, a detachable plate adapted to close the opening $a$, and having a stuffing-box for the passage of the valve-rod, and means for effecting the operation of said valve-rod, all substantially as specified.

2. The combination of the tank A, having an opening, $a$, the valve-rod D, the plate $b$, having a stuffing-box, $d$, the plate $e$, having a tubular projection, $f$, and means for operating said valve-rod, as set forth.

In testimony whereof I have signed my name to this specification in the presence of two subscribing witnesses.

ANDREW FREDERICKS.

Witnesses:
JAMES F. TOBIN,
HARRY SMITH.